United States Patent [19]
Gi-Hwan

[11] Patent Number: 5,805,227
[45] Date of Patent: Sep. 8, 1998

[54] HALF-PIXEL MOTION COMPENSATION CONTROLLER ACCEPTING MPEG2

[75] Inventor: Song Gi-Hwan, Seoul, Rep. of Korea

[73] Assignee: LG Electronics Inc., Japan

[21] Appl. No.: 531,678

[22] Filed: Sep. 21, 1995

[30]  Foreign Application Priority Data

Sep. 23, 1994 [KR] Rep. of Korea .................. 1994 24014

[51] Int. Cl.⁶ ...................................................... H04N 7/26
[52] U.S. Cl. ........................................... 348/416; 348/699
[58] Field of Search .................................... 348/624, 702, 348/391, 396, 699, 416, 394, 402, 413, 407; H04N 5/14, 7/12, 11/02, 11/04, 9/64, 7/26

[56] References Cited

U.S. PATENT DOCUMENTS

| | | | |
|---|---|---|---|
| 5,355,168 | 10/1994 | Sugiyama | 348/402 |
| 5,398,079 | 3/1995 | Lui et al. | 348/467 |
| 5,461,423 | 10/1995 | Tsukagoshi | 348/416 |
| 5,488,419 | 1/1996 | Hui et al. | 348/402 |
| 5,532,747 | 7/1996 | Yoon et al. | 348/699 |
| 5,539,467 | 7/1996 | Song et al. | 348/699 |
| 5,650,823 | 7/1997 | Ngai et al. | 348/467 |

OTHER PUBLICATIONS

Amanda Richardson et al. "STi 3220 Motion Estimation Processor", Microprocessors and Microsystems, pp. 425–434, Sep. 1993.

*Primary Examiner*—Chris Grant
*Attorney, Agent, or Firm*—Fish & Richardson, P.C.

[57]  ABSTRACT

A half-pixel motion compensation controller accepting MPEG2 data implements a half-pixel motion compensator using a four phase division of macroblock units and a clock faster than the system clock. A FIFO controller controls the compensator. The controller includes a luminance pixel unit motion compensator, a luminance half-pixel unit motion compensator, a color motion vector converter, a color pixel unit motion compensator, a color half-pixel unit motion compensator, a luminance FIFO, a color FIFO, a luminance FIFO controller, and a color FIFO controller.

23 Claims, 10 Drawing Sheets

HALF-PIXEL MOTION COMPENSATION CONTROLLER ACCEPTING MPEG2

BACKGROUND OF THE INVENTION

The present invention relates to a half-pixel motion compensation controller accepting MPEG2, which implements half-pixel motion compensation suggested according to the MPEG2 algorithm.

Generally, a half-pixel motion compensation is carried out by interpolating a result of motion compensation in full pixel units. The half-pixel motion compensation is performed by obtaining the average of desired pixel values and using an auxiliary memory or delay to simultaneously select nearby values of video data.

FIG. 1A illustrates horizontal interpolation. FIG. 1B illustrates vertical interpolation, and FIG. 1C illustrates horizontal and vertical interpolation. In these drawings, mark x represents an interpolation point.

When only the auxiliary memory is used, a memory of at least four times the number of pixels is required. This is unfavorable in cost or volume. For this reason, half-pixel motion compensation uses a delay, which requires a clock faster than the system clock.

In the MPEG2, the processing block unit of motion compensation varies with a frame/field picture and motion coding type which requires a controller.

SUMMARY OF THE INVENTION

Therefore, it is an object of the present invention to provide a half-pixel motion compensation controller accepting MPEG2, which implements a half-pixel motion compensator using a 4 phase division in units of macroblock and a clock faster than the system clock, and employs a FIFO controller to control the compensator.

To accomplish the object of the present invention, there is provided a half-pixel motion compensation controller accepting MPEG2, comprising: a luminance pixel unit motion compensator for compensating for pixel unit motion of a luminance signal according to an input luminance motion vector; a luminance half-pixel unit motion compensator for compensating for half-pixel unit motion of the luminance signal from the output of the luminance pixel unit motion compensator according to luminance half-pixel information from the luminance motion vector; a color motion vector converter for obtaining the motion vector of a color signal from the luminance motion vector; a color pixel unit motion compensator for compensating for pixel unit motion of the color signal according to the color motion vector output from the color motion vector converter; a color half-pixel unit motion compensator for compensating for half-pixel unit motion of the color signal from the output of the color pixel unit motion compensator according to color half-pixel and luminance half-pixel information from the color motion vector output from the color motion vector converter; a luminance FIFO for buffering the output data of the luminance half-pixel unit motion compensator; a color FIFO for buffering the output data of the color half-pixel unit motion compensator; a luminance FIFO controller for controlling the input and output of the luminance FIFO according to sync signals and a frame/field picture and motion coding type selection signal output from the MPEG2 system; and a color FIFO controller for controlling the input and output of the color FIFO according to sync signals and a frame/field picture and motion coding type selection signal output from the MPEG2 system.

BRIEF DESCRIPTION OF THE ATTACHED DRAWINGS

DETAILED DESCRIPTION OF THE INVENTION

Figure 1C:
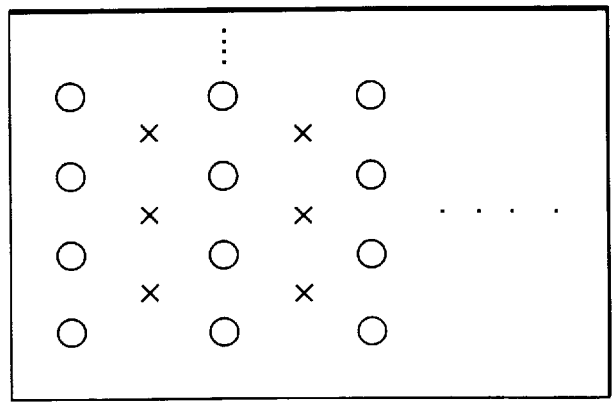
FIGS. 1A, 1B and 1C show general states of horizontal, vertical, and horizontal/vertical interpolations.
Figure 1B:
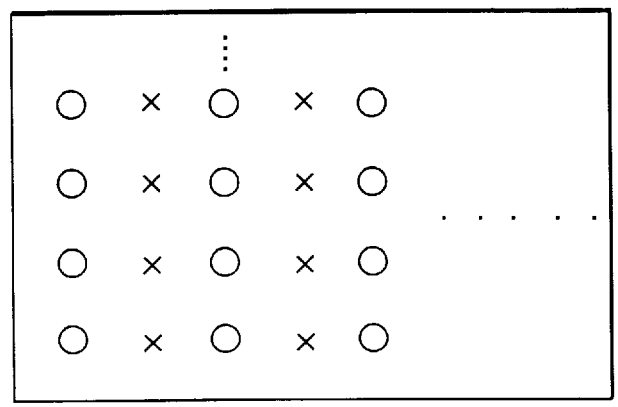
Figure 1A:
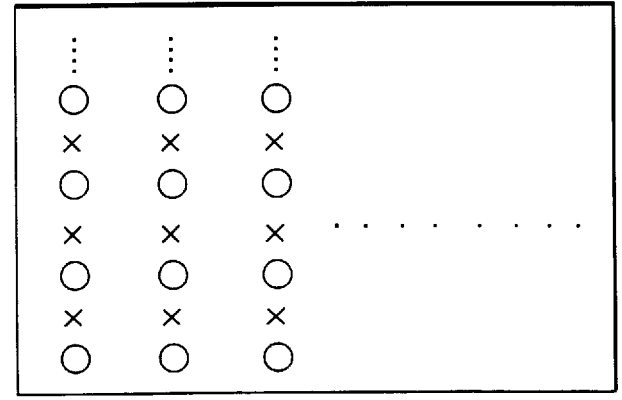
Figure 2:
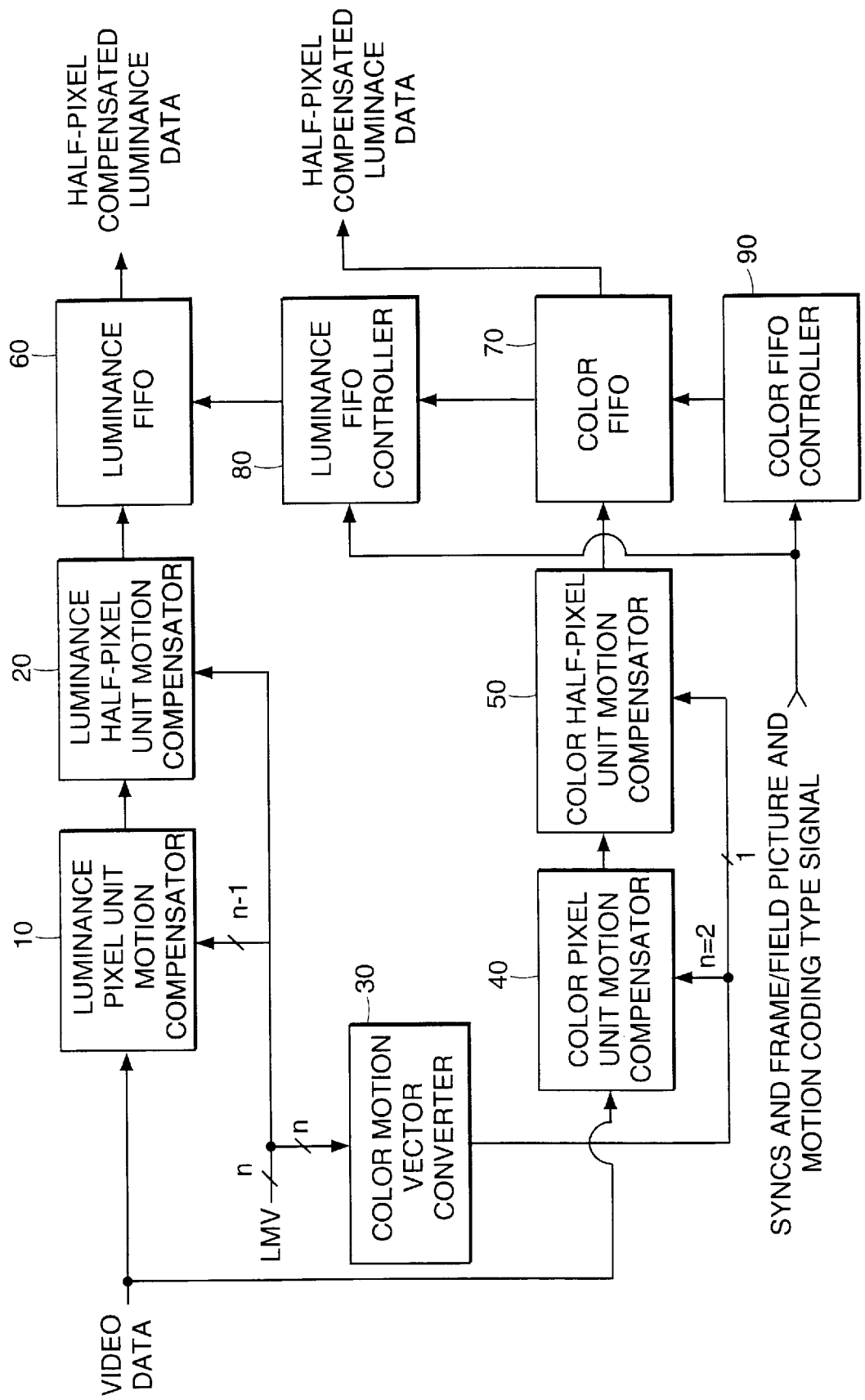
FIG. 2 is a block diagram of one embodiment of a half-pixel motion compensation controller accepting the MPEG2 of the present invention.

Referring to FIG. 2, a half-pixel motion compensation controller receiving MPEG2 comprises a luminance pixel unit motion compensator 10, luminance half-pixel unit motion compensator 20, color motion vector converter 30, color pixel unit motion compensator 40, color half-pixel unit motion compensator 50, luminance FIFO 60, color FIFO 70, luminance FIFO controller 80, and color FIFO controller 90.

Luminance pixel unit motion compensator 10 compensates for pixel unit motion of a luminance signal according to an input luminance motion vector LMV. Luminance half-pixel unit motion compensator 20 compensates for half-pixel unit motion of the luminance signal from the output of luminance pixel unit motion compensator 10 according to luminance half-pixel information from the luminance motion vector LMV.

Color motion vector converter 30 obtains the motion vector LMV of a color signal from the luminance motion vector. Color pixel unit motion compensator 40 compensates for pixel unit motion of the color signal according to the color motion vector produced by the color motion vector converter 30.

Color half-pixel unit motion compensator 50 compensates for half-pixel unit motion of the color signal from the output of color pixel unit motion compensator 40 according to color half-pixel and luminance half-pixel information included in the color motion vector produced by color motion vector converter 30.

Luminance FIFO 60 buffers the output data of half-pixel unit-motion compensator 20. Color FIFO 70 buffers the output data of color half-pixel unit motion compensator 50. Luminance FIFO controller 80 controls the input and output of luminance FIFO 60 according to sync signals and a frame/field picture and motion coding type selection signal produced by the MPEG2 system. Color FIFO controller 90 controls the input and output of color FIFO 70 according to the sync signals and the frame/field picture and motion coding type selection signal output produced by MPEG2 system.

The operation of the half-pixel motion compensation controller receiving MPEG2 will be described below.

Input video data is output as luminance video data displaced according to a luminance motion vector LMV supplied to the vector input through luminance pixel unit motion compensator 10. The luminance video data output from luminance pixel unit motion compensator 10 is input to luminance half-pixel unit motion compensator 20 so that luminance half-pixel unit motion compensation is performed according to the luminance half-pixel information from luminance motion vector LMV.

Color motion vector converter 30 obtains a color motion vector CMV, that includes, color pixel information supplied from luminance motion vector LMV. The thus obtained information is supplied to color pixel unit motion compensator 40.

Like luminance half-pixel unit motion compensator 20, color pixel unit motion compensator 40 compensates for the pixel unit motion of the color data according to color motion vector CMV, and supplies the compensation result to color half-pixel unit motion compensator 50. Then, color half-pixel unit motion compensator 50 compensates for the color half-pixel unit motion according to the color half-pixel information from color motion vector CMV.

The outputs of luminance and color half-pixel unit motion compensators 20 and 50 are supplied to luminance and color FIFOs 60 and 70, respectively, according to the control of luminance and color FIFO controllers 80 and 90. Here, unnecessary data that is inserted periodically into the output data of luminance half-pixel unit motion compensator 20 by controlling a FIFO write enable signal produced by luminance FIFO controller 80. After this process, the output data of luminance half-pixel unit motion compensator 20 is written in luminance FIFO 60. If the half-pixel motion compensation is performed using a delay, a fast-clock is used starting from the pixel unit motion compensator 10. Fast clocks are also used to write into luminance FIFO 60.

More specifically, in writing luminance data half-pixel-compensated by half-pixel unit motion compensator 20 to luminance FIFO 60, the writing of the half-pixel compensated luminance data to luminance FIFO 60 must be interrupted during the processing time for pixel unit motion compensation from the respective sync signals such as frame sync signal fsync, that is, the sync signal of motion compensation. Unnecessary data also must be extracted.

Color FIFO 70 is controlled by color FIFO controller 90, which operates similarly to luminance FIFO controller 80. The detailed operation of luminance and color FIFOs 80 and 90 will be explained later.

In luminance and color half-pixel unit motion compensators 20 and 50, a generally processed macroblock of 16×16 pixels can be formed in a single phase. However, in the event that large quantities of data must be processed (e.g., HDTV video frames), parallel processing may be employed.

If the area of a video frame is divided simply horizontally and vertically, the method of forming a macroblock in a single phase can be employed for as many blocks as result from the division. However, in the present invention, due to problems such as delay of the motion vector, a macroblock is divided into four phases to permit compensation for the pixel unit motion and half-pixel unit motion. No matter how a macroblock is divided, this method can be easily employed to the half-pixel motion compensation when a delay is used.

Meanwhile, luminance half-pixel unit motion compensator 20 obtains half-pixel compensation data by interpolating nearby values according to luminance half-pixel information. The luminance half-pixel unit motion compensator is constructed as shown in FIG. 3, in which the luminance half-pixel unit motion compensator 20 is divided into four phases, that is, 0–3 phases of a macroblock.

Figure 3:
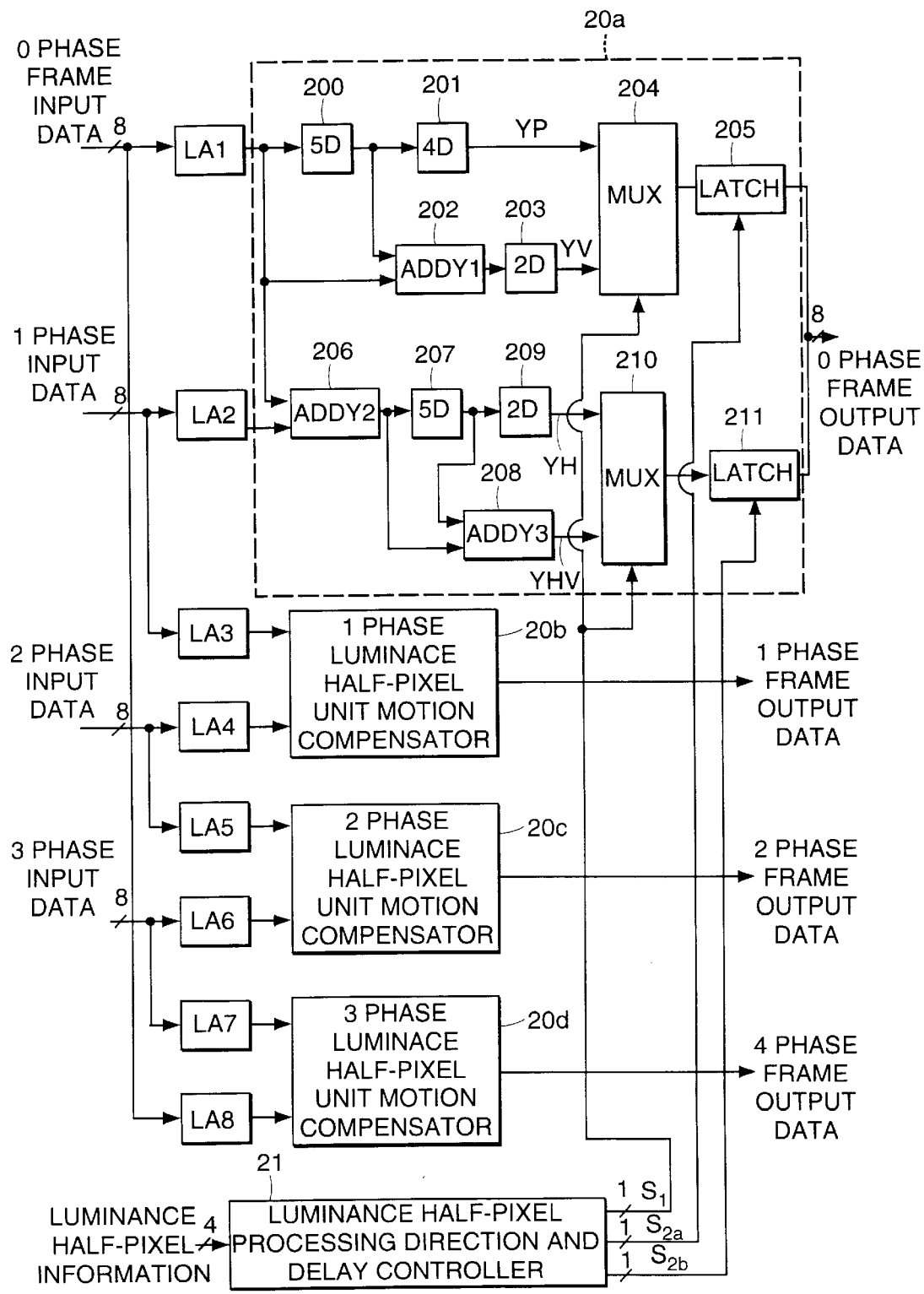
FIG. 3 is a block diagram of the luminance half-pixel unit motion compensator of FIG. 2.

In FIG. 3, luminance half-pixel unit motion compensator 20 comprises a luminance half-pixel processing direction and delay controller 21 for producing a luminance half-pixel processing direction control signal S1 and output delay control signal S2a and S2b for controlling the luminance half-pixel processing direction and output delay from luminance half-pixel information, phase-0 to phase-3 luminance half-pixel unit motion compensators 20a, 20b, 20c and 20d for making luminance half-pixel motion compensation data of the respective phases from their input data, and outputting luminance half-pixel motion compensation data of the respective phases according to luminance half-pixel processing direction control signal S1 and output delay control signals S2a and S2b from luminance half-pixel processing direction and delay controller 21, and a latch portion for latching the input data of the respective phases in parallel, and outputting them to the 0–3 phase luminance half-pixel unit motion compensators.

Here, the latch portion comprises a latch LA1 for latching the input data of phase 0 and outputting it to phase-0 luminance half-pixel unit motion compensator 20a, a latch LA2 for latching the input data of phase 1 and outputting it to phase-0 luminance half-pixel unit motion compensator 20a, a latch LA3 for latching the input data of phase 1 and outputting it to phase-1 luminance half-pixel unit motion compensator 20b, a latch LA4 for latching the input data of phase 2 and outputting it to phase-1 luminance half-pixel unit motion compensator 20b, a latch LA5 for latching the input data of phase 2 and outputting it to phase-2 luminance half-pixel unit motion compensator 20c, a latch LA6 for latching the input data of phase 3 and outputting it to phase-2 luminance half-pixel unit motion compensator 20c, a latch LA7 for latching the input data of phase 3 and outputting it to phase-3 luminance half-pixel unit motion compensator 20d, and a latch LA8 for latching the input data of phase 0 and outputting it to phase-3 luminance half-pixel unit motion compensator 20d.

Phase-0 luminance half-pixel unit motion compensator 20a comprises a 5 delay portion 200 for delaying the input data of phase 0 by five pixels, a 4 delay portion 201 for delaying the output of 5 delay portion 200 by four pixels to obtain pixel unit luminance interpolation data, an adding portion 202 for arithmetically averaging the input data of phase 0 and the output of 5 delay portion 200 to obtain luminance interpolation data, a 2 delay portion 203 for delaying the output of adding portion 202 by two pixels to output luminance vertical interpolation data, an adding portion 206 for arithmetically averaging the input data of phase 0 and phase 1 to obtain luminance interpolation data, a 5 delay portion 207 for sequentially delaying the output of adding portion 206 by five pixels, a 2 delay portion 209 for delaying the output of 5 delay portion 207 by two pixels to output luminance horizontal interpolation data, an adding portion 208 for arithmetically averaging the output of adding portion 206 and the output of 5 delay portion 207 to obtain luminance horizontal and vertical interpolation data, a multiplexer 204 for selecting and outputting one of the pixel unit luminance interpolation data output from 4 delay portion 201 and the luminance vertical interpolation data output from 2 delay portion 203 according to the luminance half-pixel processing direction control signal output from luminance half-pixel processing direction and delay controller 21, a multiplexer 210 for selecting and outputting one of the luminance horizontal interpolation data output from 2 delay portion 209 and the luminance horizontal and vertical interpolation data output from adding portion 208 according to the luminance half-pixel processing direction control signal output from luminance half-pixel processing direction and delay controller 21, a latch portion 205 for latching the output of multiplexer 204 and outputting it to luminance FIFO 60 according to the output delay control signal output from luminance half-pixel processing direction and delay controller 21, and a latch portion 211 for latching the output of multiplexer 210 and outputting it to luminance FIFO 60 according to the output delay control signal output from luminance half-pixel processing direction and delay controller 21.

Figure 4:
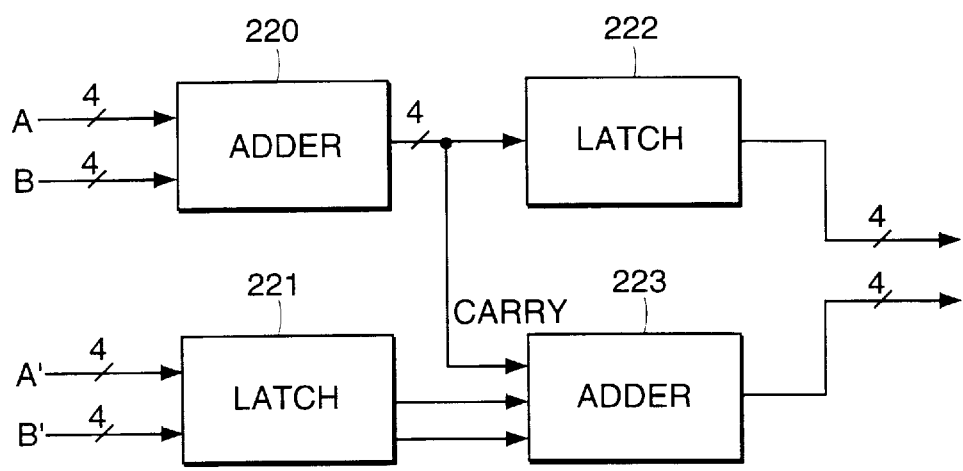
FIG. 4 is a detailed block diagram of the adder of FIG. 3.

Here, as shown in FIG. 4, adding portion 202 comprises an adder 220 for dividing the input data of phase 0 and the output of 5 delay portion 200 into the upper and lower bits, and summing the lower bits, a latch 222 for latching the output of adder 220, a latch 221 for dividing the input data of phase 0 and the output of 5 delay portion 200 into the upper and lower bits, and latching the upper bits, and an adder 223 for adding and outputting the outputs of adder 220 and latch 221.

Like adding portion 202, adding portion 206 comprises an adder 220 for dividing the input data of phase 0 and phase 1 into the upper and lower bits, and summing the lower bits, a latch 222 for latching the output of adder 220, a latch 221 for dividing the input data of phase 0 and phase 1 into the upper and lower bits, and latching the upper bits, and an adder 223 for adding and outputting the outputs of adder 220 and latch 221.

Like adding portion 202 or 206, adding portion 208 comprises an adder 220 for dividing the output of adding portion 206 and the output of 5 delay portion 207 into the upper and lower bits, and summing the lower bits, a latch 222 for latching the output of adder 220, a latch 221 for dividing the output of adding portion 206 and the output of 5 delay portion 207 into the upper and lower bits, and latching the upper bits, and an adder 223 for adding and outputting the outputs of adder 220 and latch 221.

Phase-1 to phase-3 luminance half-pixel unit motion compensators 20b, 20c and 20d are constructed in the same manner as phase-0 luminance half-pixel unit motion compensator 20a.

When a 16×16 macroblock is divided into four phases at the X axis, it becomes a 4×16 processing block. For interpolation, 5×17 pixels of data are required due to side data interpolation. For a field picture, 5×18 pixels of data are required. To obtain 4×16 pixels of interpolation data a clock having a speed greater than or equal to the system clock (mclk)×(5×18/4×16) is required.

In FIG. 3, when a pixel unit has no half-pixel information, data that has been delayed by nine pixels by passing through 5 delay portion 200 and 4 delay portion 201 is passed to obtain pixel unit luminance interpolation data YP.

When the Y direction, that is, the vertical direction, is 1, the output of 5 delay portion 200 and the output of latch LA1 are added in adding portion 202. The added result is divided by 2 to obtain vertical interpolation data, which is delayed in 2 delay portion 203. By doing so, luminance vertical interpolation data YV is obtained.

When the X direction, that is, the horizontal direction, is 1, the output of latch LA2 of the succeeding phase, that is, n+1 phase, and the output of latch LA1 are interpolated in adding portion 206, and delayed by seven pixels through 5 delay portion 207 and 2 delay portion 209. By doing so, luminance horizontal interpolation data YH is obtained.

When both the X and Y directions, that is, the horizontal and vertical directions, are 1, the result interpolated horizontally in adding portion 206 and the output of 5 delay portion 207 are re-interpolated in adding portion 208, obtaining horizontal and vertical interpolation data YHV.

Pixel unit luminance interpolation data YP and luminance vertical interpolation data YV are selected in multiplexer 204 according to processing direction control signal S1 from luminance half-pixel processing direction and delay controller 21, and luminance horizontal interpolation data YH and luminance horizontal/vertical interpolation data YHV in multiplexer 210. They are latched in latch portions 205 and 211.

The outputs of multiplexers 204 and 210 are supplied to latch portions 205 and 211 according to output delay control signals S2a and S2b from luminance half-pixel processing direction and delay controller 21.

Specifically, one of pixel unit luminance interpolation data YP, vertical and horizontal luminance interpolation data YV and YH, and horizontal/vertical luminance interpolation data YHV is output as half-pixel motion compensation data for phase 0 through multiplexers 204 and 210 and latch portions 205 and 211 according to processing direction control signal S1 and output delay control signals S2a and S2b from luminance half-pixel processing direction and delay controller 21. Here, output delay control signals S2a and S2b are delayed as long as the data is delayed during multiplexing in order to perform synchronization.

Half-pixel motion compensation data for phases 1–3 is produced in the same way that data is produced for phase 0.

Adding portions 202, 206 and 208 perform interpolation with processing time 2D, and are usually used, as shown in FIG. 4. Adding portions 202, 206 and 208 have latches 222 and 221 in order to separate an eight-bit adder into four-bit adders, match speeds, divide the adder by two, and perform synchronization. The adding portions output the average of the two inputs, which is interpolation data.

Figure 5:
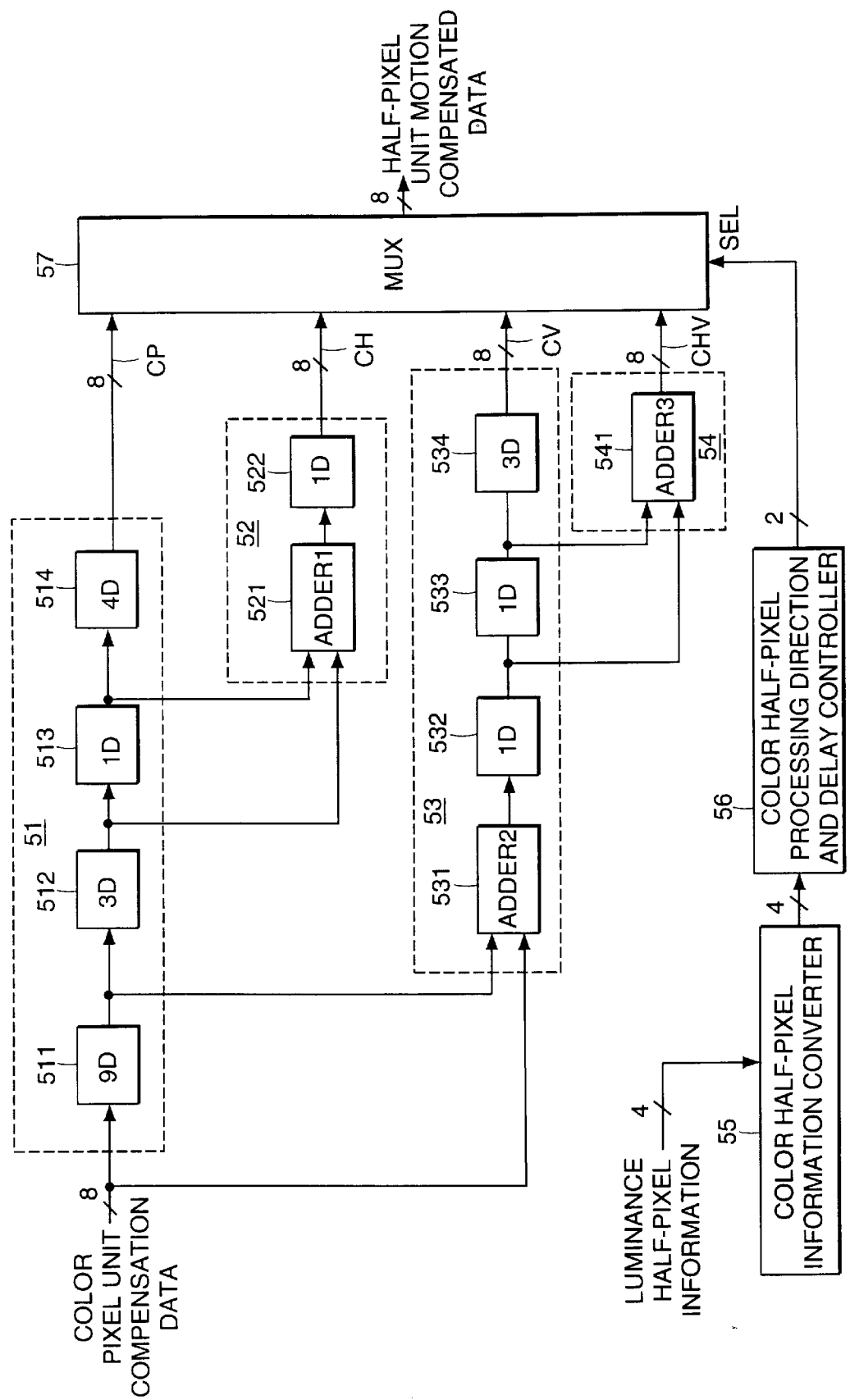
FIG. 5 is a block diagram of the color half-pixel unit motion compensator.

As shown in FIG. 5, color half-pixel unit motion compensator 50 comprises a pixel unit color interpolator 51 for delaying color pixel unit compensation data output from color pixel unit motion compensator 40, and outputting pixel unit color interpolation data, a color horizontal interpolator 52 for outputting color horizontal interpolation data using the color pixel unit compensation data delayed in pixel unit color interpolator 51, a color vertical interpolator 53 for outputting color vertical interpolation data using the color pixel unit compensation data delayed in color pixel unit motion compensator 40 and pixel unit color interpolator 51, a color horizontal and vertical interpolator 54 for outputting color horizontal and vertical interpolation data using data output from color vertical interpolator 53, a multiplexer 57 for selecting one of pixel unit color interpolation data output from pixel unit color interpolator 51, color horizontal interpolation data output from color horizontal interpolator 52, color vertical interpolation data output from color vertical interpolator 53, and color horizontal and vertical interpolation data output from color horizontal and vertical interpolator 54, and outputting color half-pixel unit motion compensation data, a color half-pixel information converter 55 for obtaining color half-pixel information from luminance half-pixel information output from color motion vector converter 30, and a color half-pixel processing direction and delay controller 56 for outputting a selection signal to multiplexer 57 to control the output selection and output delay of multiplexer 57.

Here, pixel unit color interpolator 51 comprises a 9 delay portion 511 for delaying color pixel unit compensation data output from color pixel unit motion compensator 40 by nine pixels, and outputting the delayed data to color vertical interpolator 53, a 3 delay portion 512 for delaying the data output from 9 delay portion 511 by three pixels, and outputting the delayed data to color horizontal interpolator 52, a 1 delay portion 513 for delaying the data output from 3 delay portion 512 by one pixel, and outputting the delayed data to color horizontal interpolator 52, and a 4 delay portion 514 for delaying the data output from 1 delay portion 513 by four pixels to output pixel unit color interpolation data to multiplexer 57.

Color horizontal interpolator 52 comprises an adding portion 521 for arithmetically averaging the color pixel unit compensation data delayed from 3 delay portion 512 and 1 delay portion 513 of pixel unit color interpolator 51, and a 1 delay portion 522 for delaying the data output from adding portion 521 by one pixel to output color horizontal interpolation data.

Figure 6:
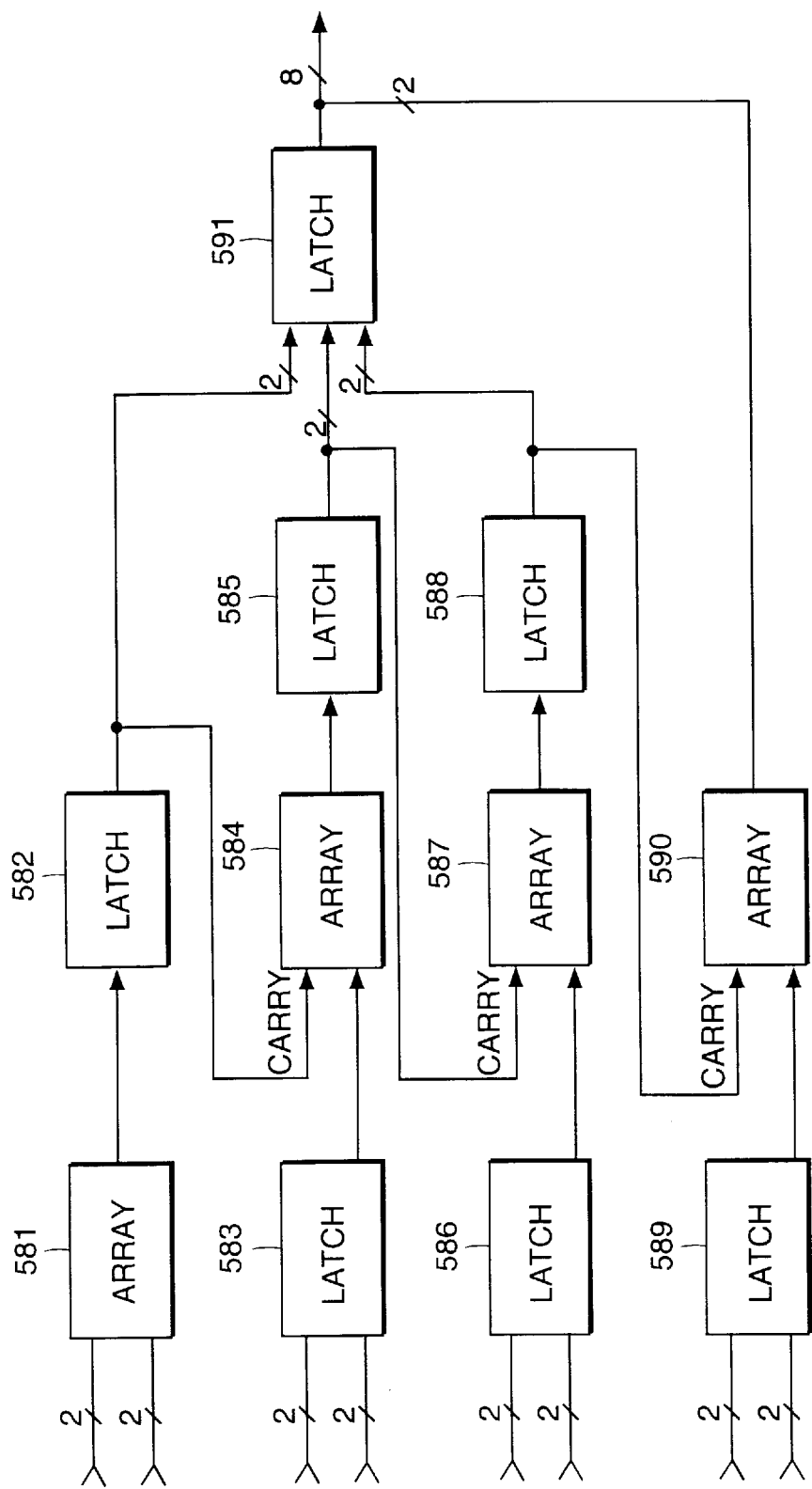
FIG. 6 is a detailed block diagram of the adder of FIG. 5.

Here, as shown in FIG. 6, adding portion 521 comprises an adder 581 for dividing the color pixel unit compensation data delayed from 3 delay portion 512 and 1 delay portion 513 of pixel unit color interpolator 51 in units of two bits, and summing the lowest two bits, a latch 582 for latching the output of adder 581 for synchronization and outputting two-bit data, a latch 583 for dividing the color pixel unit compensation data delayed from 3 delay portion 512 and 1 delay portion 513 of pixel unit color interpolator 51 in units of two bits, and latching the second lowest two bits for synchronization, an adder 584 for summing the output of latch 583 and the carry output from latch 582, a latch 585 for latching the output of adder 584 for synchronization to output two-bit data, a latch 586 for dividing the color pixel unit compensation data delayed from 3 delay portion 512 and 1 delay portion 513 of pixel unit color interpolator 51 in units of two bits, and latching the third lowest two bits for synchronization, an adder 587 for summing the output of latch 586 and the carry output from latch 585, a latch 588 for latching the output of adder 587 for synchronization to output two-bit data, a latch 589 for dividing the color pixel unit compensation data delayed from 3 delay portion 512 and 1 delay portion 513 of pixel unit color interpolator 51 in units of two bits, and latching the highest two bits for synchronization, an adder 590 for summing the output of latch 589 and the carry output from latch 588 to output two-bit data, and a latch 591 for latching the output of latches 582, 585 and 588 for synchronization.

Color vertical interpolator 53 comprises an adding portion 531 for arithmetically averaging the color pixel unit compensation data delayed from color pixel unit motion compensator 40 and pixel unit color interpolator 51, a 1 delay portion 532 for delaying the data output from adding portion 531 by one pixel to output it to color horizontal and vertical interpolator 54, a 1 delay portion 533 for delaying the data output from 1 delay portion 532 by one pixel to output it to color horizontal and vertical interpolator 54, and a 3 delay portion 534 for delaying the data output from 1 delay portion 533 by three pixels to output color vertical interpolation data to multiplexer 57.

Here, as shown in FIG. 6, adding portion 531 is constructed in the same manner as that of color horizontal interpolator 52. Adding portion 531 comprises an adder 581 for dividing the color pixel unit compensation data delayed from color pixel unit motion compensator 40 and 9 delay portion 511 of pixel unit color interpolator 51 in units of two bits, and summing the lowest two bits, a latch 582 for latching the output of adder 581 for synchronization and outputting two-bit data, a latch 583 for dividing the color pixel unit compensation data delayed from color pixel unit motion compensator 40 and 9 delay portion 511 of pixel unit color interpolator 51 in units of two bits, and latching the second lowest two bits for synchronization, an adder 584 for summing the output of latch 583 and the carry output from latch 582, a latch 585 for latching the output of adder 584 for synchronization to output two-bit data, a latch 586 for dividing the color pixel unit compensation data delayed from color pixel unit motion compensator 40 and 9 delay portion 511 of pixel unit color interpolator 51 in units of two bits, and latching the third lowest two bits for synchronization, an adder 587 for summing the output of latch 586 and the carry output from latch 585, a latch 588 for latching the output of adder 587 for synchronization to output two-bit data, a latch 589 for dividing the color pixel unit compensation data delayed from color pixel unit motion compensator 40 and 9 delay portion 511 of pixel unit color interpolator 51 in units of two bits, and latching the highest two bits for synchronization, an adder 590 for summing the output of latch 589 and the carry output from latch 588 to output two-bit data, and a latch 591 for latching the output of latches 582, 585 and 588 for synchronization.

Color horizontal and vertical interpolator 54 comprises an adder 541 for arithmetically averaging the data output from 1 delay portions 532 and 533 of color vertical interpolator 53, and outputting color horizontal and vertical interpolation data. Here, as shown in FIG. 6, adding portion 541 is constructed in the same manner as that of color horizontal interpolator 52. Adding portion 541 comprises an adder 581 for dividing the data delayed from 1 delay portions 532 and 533 of color vertical interpolator 53 in units of two bits, and summing the lowest two bits, a latch 582 for latching the output of adder 581 for synchronization and outputting two-bit data, a latch 583 for dividing the data delayed from 1 delay portions 532 and 533 of color vertical interpolator 53 in units of two bits, and latching the second lowest two bits for synchronization, an adder 584 for summing the output of latch 583 and the carry output from latch 582, a latch 585 for latching the output of adder 584 for synchronization to output two-bit data, a latch 586 for dividing the color pixel unit compensation data delayed from 1 delay portions 532 and 533 of color vertical interpolator 53 in units of two bits, and latching the third lowest two bits for synchronization, an adder 587 for summing the output of latch 586 and the carry output from latch 585, a latch 588 for latching the output of adder 587 for synchronization to output two-bit data, a latch 589 for dividing the data output from 1 delay portions 532 and 533 of color vertical interpolator 53 in units of two bits, and latching the highest two bits for synchronization, an adder 590 for summing the output of latch 589 and the carry output from latch 588 to output two-bit data, and a latch 591 for latching the output of latches 582, 585 and 588 for synchronization.

Here, as shown in FIG. 6, adding portions 521, 531 and 541 each form an eight-bit adder with two-bit adders in order to match speeds in one clock. In the same way for luminance, the adding portions output average values. Color half-pixel unit motion compensator 50 has 17 D for the overall processing time, and operates in the same principle as that of luminance half-pixel unit motion compensator 20.

Because the color signal is decimated into half horizontally (X) and vertically (Y) with respect to the luminance signal, a macroblock becomes 8×8 pixels. For this reason, 4 phase division is not performed because the processing speed of the color signal without 4 phase division is the same as the processing speed of luminance when luminance is divided into four phases.

Due to the side pixels of a block to be processed, actually required data is 9×9 pixels for interpolation in color half-pixel unit motion compensator 50.

Figure 7:
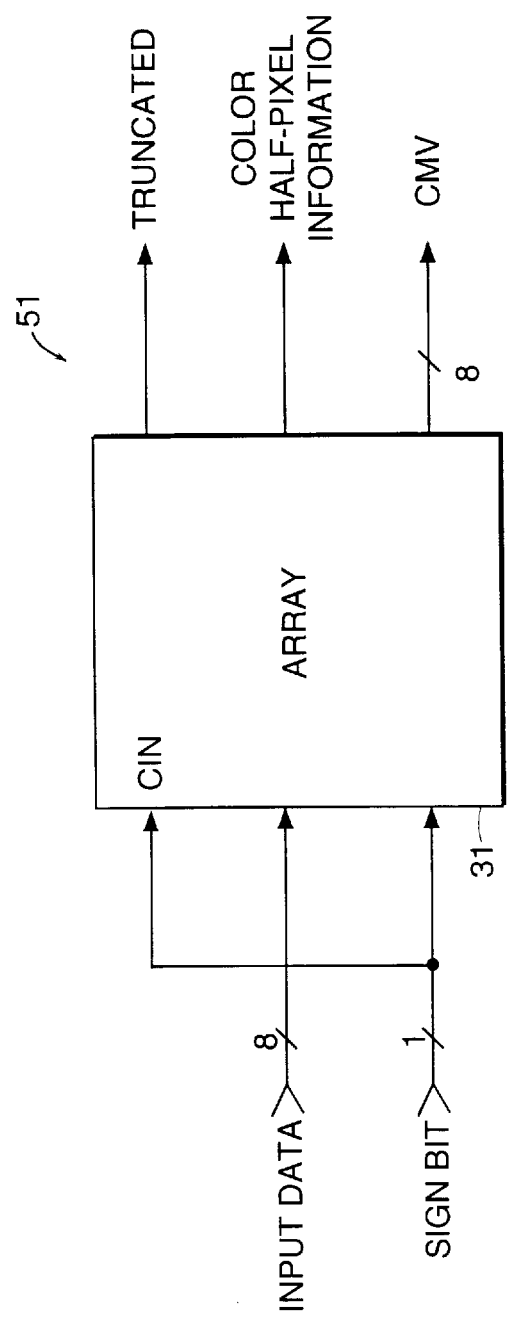
FIG. 7 shows the configuration of the color motion vector converter of FIG. 2.

Referring to FIG. 7, color motion vector converter 30 comprises an adding portion in which the highest bit of the luminance motion vector is input as carry, in case that it is negative, 1 is added to the input, and the lowest bit is truncated to obtain color motion vector CMV. Of color motion vector CMV, the lowest bit is half-pixel motion information.

In other words, color motion vector converter 30 including color half-pixel information converter 51 of FIG. 7 forms adding portion 31 consisting of three four-bit adders (not shown). In this configuration, the highest bit of luminance motion vector LMV is coupled to carry input portion Cin of adding portion 31. In case that it is negative, 1 is added thereto. After this, the lowest bit of the output data is truncated to obtain color motion vector CMV. The lowest bit of the remaining bits becomes half-pixel motion information.

Figure 8A:
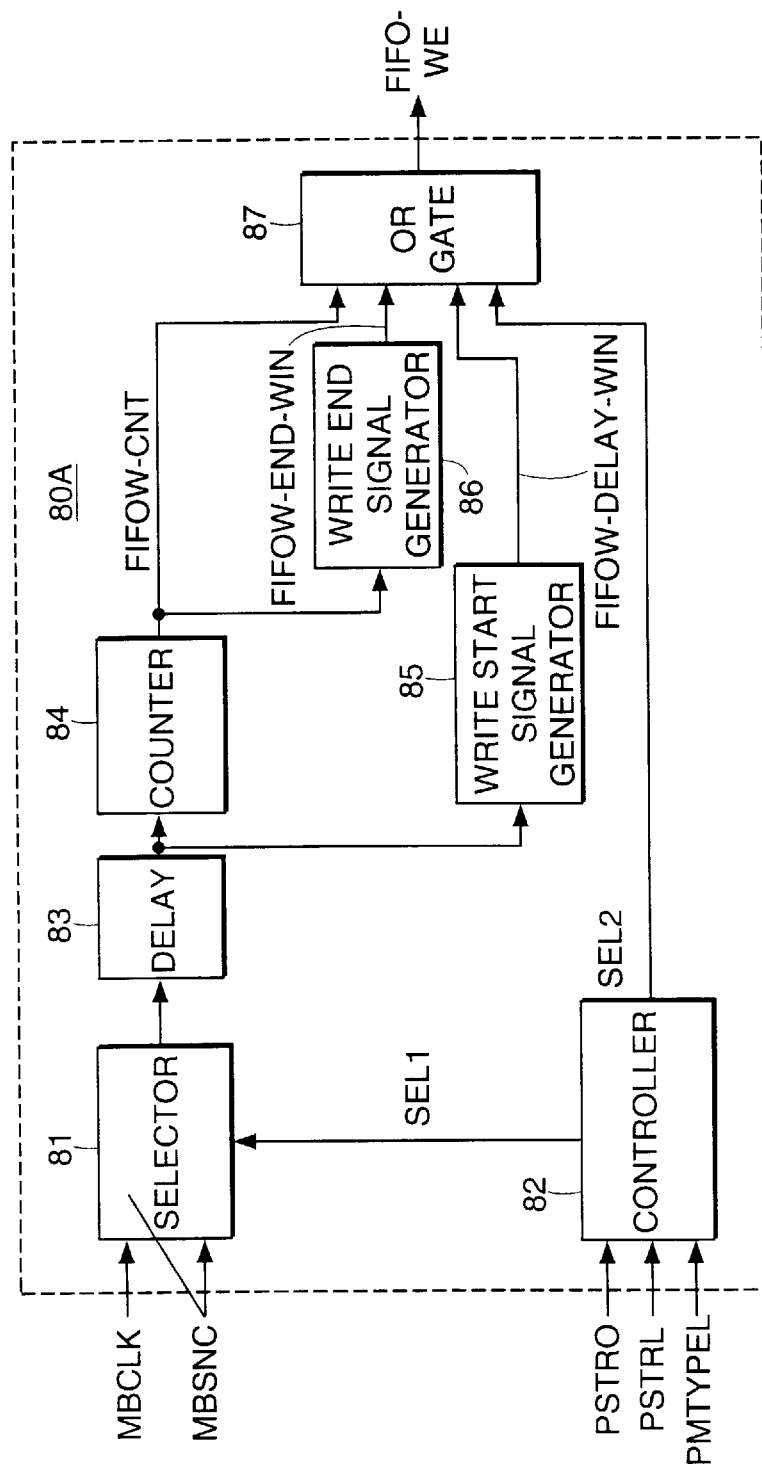
FIG. 8A is a block diagram of the write signal generator of the luminance FIFO controller of FIG. 2.
Figure 8B:
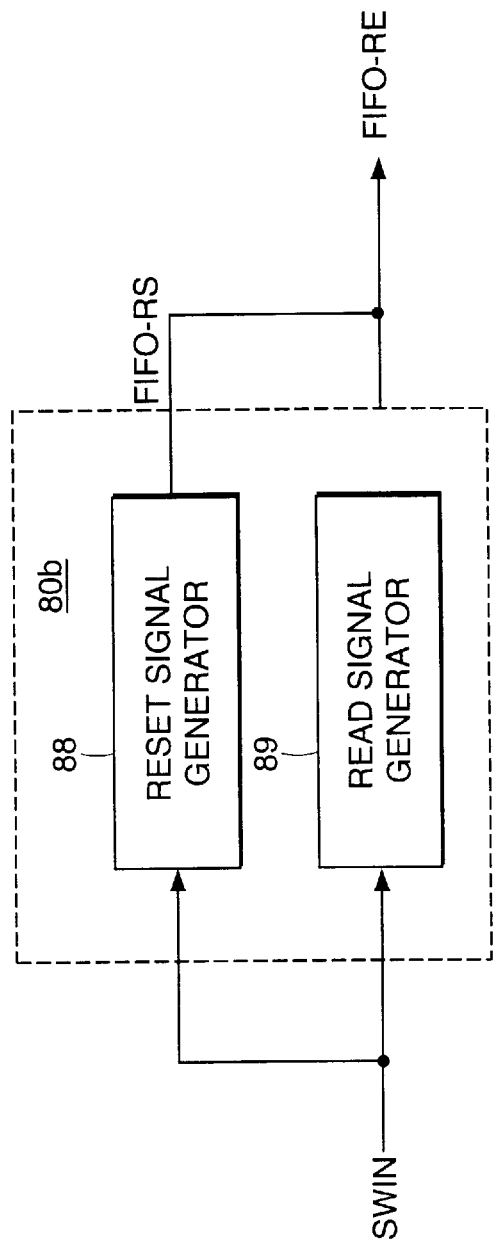
FIG. 8B is a block diagram of the read signal generator of the luminance FIFO controller of FIG. 2.

Referring to FIGS. 8A and 8B, the luminance FIFO controller 80 comprises a luminance write signal generator 80a for generating a write signal according to the respective sync signals and frame/field picture and motion coding type selection signal output from the MPEG2 system, and outputting the write signal to luminance FIFO 60, and a luminance read signal generator 80b for generating a read signal according to the respective sync signals and frame/field picture and motion coding type selection signal output from the MPEG2 system, and outputting the read signal to luminance FIFO 60.

Here, as shown in FIG. 8A, luminance write signal generator 80a comprises a selector 81 for selecting one of a macroblock clock mbclk and macroblock sync signal mbsync, a controller 82 for outputting a selection signal sel to selector 81 according to picture structure type signals pstr0 and pstr1 and picture motion type signal pmtype1 output from the MPEG2 system, a delay 83 for delaying the output of selector 81, a counter 84 for counting the output of delay 83 and generating a sawtooth-wave signal fifow-cnt for not writing unnecessary data, a write start signal generator 85 for generating a write start signal fifow-delay-win from the output of delay 83, a write completion signal generator 86 for generating write completion signal fifow-end-win from the output of counter 84, and an OR gate 87 for OR-operating the outputs of controller 82, counter 84, write signal start generator 85, and write completion signal generator 86, and generating a luminance write signal fifo-we.

As shown in FIG. 8b, luminance read signal generator 80b comprises a reset signal generator 88 for generating a reset signal fifo-rs in units of macroblocks according to a slice window signal swin output from the MPEG2 system, and outputting the result to luminance FIFO 60, and a read signal generator 89 for generating a read signal fifo-re according to slice window signal swin output from the MPEG2 system, and outputting the result to luminance FIFO 60. The operation of luminance FIFO controller 80 will be described with the timing diagrams of FIG. 9.

Luminance FIFO controller 80 selects only a required part from data half-pixel-motion-compensated by the fast clock, inputs it to luminance FIFO 60 and outputs it in accordance with system clock mclk, finishing half-pixel motion compensation.

When controller 82 supplies selection signal Sell to selector 81 according to picture structure type signals pstr0 and pstr1 and picture motion type signal pmtype1, selector 81 selects one of macroblock clock mbclk and macroblock sync signal mbsync according to selection signal Sel1. The thus selected signal is input to counter 84 and write start signal generator 85 through delay 83.

Counter 84 generates sawtooth-wave signal fifow-cnt for not writing unnecessary data produced from 5×17 pixels by the interval of four pixels to luminance FIFO 60.

Write start signal generator 85 generates write start signal fifow-delay-win, which calculates a delay time taken by data coming from frame sync signal fsync, a reference signal, to the input port of luminance FIFO 60, and inputs data to luminance FIFO 60 after the delay time.

Write completion signal generator 86 generates write completion signal fifow-end-win from the output of counter 84. This signal disables the remaining processing time after processing by one macroblock period or half period according to picture structure type signals pstr0 and pstr1 and picture motion type signal pmtype1.

Sawtooth-wave signal fifow-cnt and write start and completion signals fifow-delay-win and fifow-end-win are OR-operated with selection signal Sel2 for disabling the data input of luminance FIFO 60 while slice window signal swin indicative of a data active area, macroblock sync signal mbsync and macroblock clock mbclk are changed, in OR gate 87. The OR-operated result is generated as write signal fifo-we of luminance FIFO 60.

Read signal generator 80b generates read signal fifo-re from read signal generator 89 using slice window signal swin. The read signal fifo-re makes data read after one macroblock so as not to allow luminance FIFO 60 to under-flow. Reset signal fifo-rs is generated from reset signal generator 88 for every macroblock.

Figure 9:
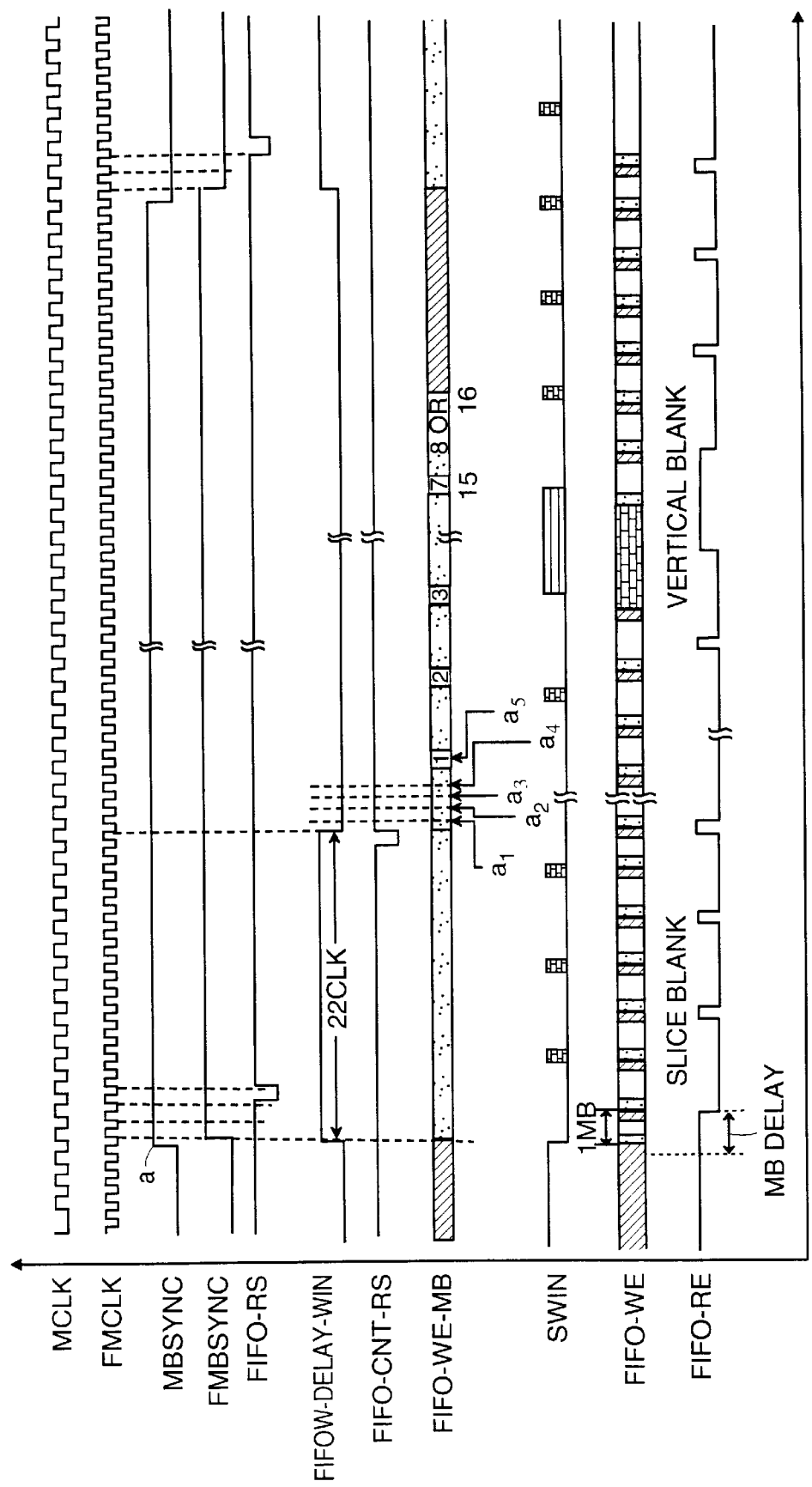
FIG. 9 illustrates the waveforms of respective signals of the half-pixel motion compensation controller accepting the MPEG2 of the present invention.

In FIG. 9, the fast system clock fmclk is latched by a, using macroblock sync signal mbsync, forming a fast macroblock sync signal fmbsync, which is used in writing or reading.

Color FIFO controller 90 consists of a color write signal generator and color read signal generator. Because the macroblock of the color signal is 8×8 pixels, color FIFO controller 90 is differentiated from luminance FIFO controller 80, with sawtooth-wave signal fifow-cnt to prevent writing of unnecessary data, and with the different number of counters of counter 84. Other parts are the same as luminance FIFO controller 80.

Color FIFO controller 90 comprises a write signal generator for generating a color write signal according to the respective sync signals and frame/field picture and motion coding type selection signal output from the MPEG2 system, and outputting the result to color FIFO 70, and a color read signal generator for generating a color read signal according to the respective sync signals and frame/field picture and motion coding type selection signal output from the MPEG2 system, and outputting the result to color FIFO 70.

Counter 84 of luminance FIFO controller 80 generates sawtooth-wave signal fifow-cnt to prevent writing of unnecessary data produced from 5×17 pixels by the interval of four pixels to luminance FIFO 60. However, because sawtooth-wave signal fifow-cnt of color FIFO controller 90 is 9×9 pixel unit in case of color so that it functions to input eight-pixel data and eliminate the ninth interpolation value. Except for this respect, the operation of color FIFO controller 90 is the same as that of luminance FIFO controller 80.

In FIG. 9, signal fifo-cnt-rs reset luminance and color FIFOs 60 and 70 each frame. Signal fifo-we-mb is a write signal for one macroblock. Reference numerals a1–a4 indicate four-pixel data for writing after being delayed by macroblock sync signal mbsync. Reference numeral a5 corresponds to data that is not written. These operations are repeated eight times or sixteen times according to picture structure type signals pstr0 and pstr1, which are then disabled until the next macroblock.

As described above, the present invention uses a 4 phase division of macroblock units, a clock faster than the system clock, and a FIFO controller, implementing a half-pixel motion compensator accepting the MPEG2 algorithm.

What is claimed is:

1. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal, said luminance half-pixel unit motion compensator comprising:

a luminance half-pixel processing direction and delay controller for producing a luminance half-pixel processing direction control signal for controlling a luminance half-pixel processing direction and output delay control signals for controlling a delay between receipt of a unit-compensated luminance signal and a half-unit-compensated luminance signal, and four phase luminance half-pixel unit motion compensators for producing luminance half-pixel motion compensation data from respective chases of a unit-compensated luminance signal according to the luminance half-pixel processing direction control signal and output delay control signals from said luminance half-pixel processing direction and delay controller;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal;

a color half-pixel unit motion compensator for compensating for half-pixel unit motion of said unit-compensated color signal according to color half-pixel information from the color motion vector to produce a half-unit-compensated color signal;

a luminance FIFO for buffering the half-unit-compensated luminance signal produced by said luminance half-pixel unit motion compensator;

a color FIFO for buffering the half-unit-compensated color signal produced by said color half-pixel unit motion compensator;

a luminance FIFO controller for controlling input and output of said luminance FIFO according to sync signals and a frame/field picture and motion coding type selection signal output from the MPEG2 system; and a color FIFO controller for controlling input and output of said color FIFO according to sync signals and a frame/field picture and motion coding type selection signal output from the MPEG2 system.

2. A half-pixel motion compensation controller accepting MPEG2 as claimed in claim 1, further comprising a latch portion for latching the unit compensated luminance signal and supplying the latched unit-compensated luminance signal to said four phase luminance half-pixel unit motion compensators.

3. A half-pixel motion compensation controller accepting MPEG2 as claimed in claim 2, wherein said four phase luminance half-pixel unit motion compensators include phase 0, phase 1, phase 2 and phase 3 compensators, and said latch portion comprises:

a first latch for latching phase 0 data and outputting it to said phase 0 luminance half-pixel unit motion compensator;

a second latch for latching phase 1 data and outputting it to said phase 0 luminance half-pixel unit motion compensator;

a third latch for latching phase 1 data and outputting it to said phase 1 luminance half-pixel unit motion compensator;

a fourth latch for latching phase 2 data and outputting it to said phase 1 luminance half-pixel unit motion compensator;

a fifth latch for latching phase 2 data and outputting it to said phase 2 luminance half-pixel unit motion compensator;

a sixth latch for latching phase 3 data and outputting it to said phase 2 luminance half-pixel unit motion compensator;

a seventh latch for latching phase 3 data and outputting it to said phase 3 luminance half-pixel unit motion compensator; and an eighth latch for latching phase 0 data and outputting it to said phase 3 luminance half-pixel unit motion compensator.

4. A half-pixel motion compensation controller accepting MPEG2 as claimed in claim 1, including a phase 0 luminance half-pixel unit motion compensator that comprises:

a first 5 delay portion for delaying phase 0 data by five pixels;

a 4 delay portion for delaying an output of said first 5 delay portion by four pixels to obtain pixel unit luminance interpolation data;

a first adding portion for arithmetically averaging the phase 0 data and the output of said first 5 delay portion to obtain luminance interpolation data;

a first 2 delay portion for delaying an output of said first adding portion by two pixels to output luminance vertical interpolation data;

a second adding portion for arithmetically averaging the phase 0 data and phase 1 data to obtain luminance interpolation data;

a second 5 delay portion for sequentially delaying an output of said second adding portion by five pixels;

a second 2 delay portion for delaying an output of said second 5 delay portion by two pixels to output luminance horizontal interpolation data;

a third adding portion for arithmetically averaging the output of said second adding portion and the output of said second 5 delay portion to obtain luminance horizontal and vertical interpolation data;

a first multiplexer for selecting and outputting one of the pixel unit luminance interpolation data output from said 4 delay portion and the luminance vertical interpolation data output from said first 2 delay portion according to the luminance half-pixel processing direction control signal output from said luminance half-pixel processing direction and delay controller;

a second multiplexer for selecting and outputting one of the luminance horizontal interpolation data output from said second 2 delay portion and the luminance horizontal and vertical interpolation data output from said third adding portion according to the luminance half-pixel processing direction control signal output from said luminance half-pixel processing direction and delay controller;

a first latch portion for latching the output of said first multiplexer and outputting it to said luminance FIFO according to the output delay control signal output from said luminance half-pixel processing direction and delay controller; and a second latch portion for latching the output of said second multiplexer and outputting it to said luminance FIFO according to the output delay control signal output from said luminance half-pixel processing direction and delay controller.

5. A half-pixel motion compensation controller accepting MPEG2 as claimed in claim 4, wherein said first adding portion comprises:

a first adder for dividing the phase 0 data and the output of said first 5 delay portion into upper and lower bits, and summing the lower bits of the phase 0 data and the output of said first 5 delay portion;

a first latch for latching an output of said first adder;

a second latch for dividing the phase 0 data and the output of said first 5 delay portion into upper and lower bits, and latching the upper bits; and a second adder for adding and outputting outputs of said first adder and said second latch.

6. A half-pixel motion compensation controller accepting MPEG2 as claimed in claim 4, wherein said second adding portion comprises:

a first adder for dividing the phase 0 and phase 1 data into upper and lower bits, and summing the lower bits;

a first latch for latching the output of said first adder;

a second latch for dividing the phase 0 and phase 1 data into upper and lower bits, and latching the upper bits; and a second adder for adding and outputting the outputs of said first adder and said second latch.

7. A half-pixel motion compensation controller accepting MPEG2 as claimed in claim 4, wherein said third adding portion comprises:

a first adder for dividing the output of said second adding portion and the output of said second 5 delay portion into the upper and lower bits, and summing the lower bits;

a first latch for latching the output of said first adder;

a second latch for dividing the output of said second adding portion and the output of said second 5 delay portion into upper and lower bits, and latching the upper bits; and a second adder for adding and outputting the outputs of said first adder and said second latch.

8. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal;

a color half-pixel unit motion compensator for compensating for half-pixel unit motion of said unit-compensated color signal according to color half-pixel information from the color motion vector to produce a half-unit-compensated color signal;

a luminance FIFO for buffering the half-unit-compensated luminance signal produced by said luminance half-pixel unit motion compensator;

a color FIFO for buffering the half-unit-compensated color signal produced by said color half-pixel unit motion compensator;

a luminance FIFO controller for controlling input and output of said luminance FIFO according to sync signals and a frame/field picture and motion coding type selection signal output from the MPEG2 system; and a color FIFO controller for controlling input and output of said color FIFO according to sync signals and a frame/field picture and motion coding type selection signal output from the MPEG2 system, wherein said color half-pixel unit motion compensator comprises:

a pixel unit color interpolator for delaying color pixel unit compensation data output from said color pixel unit motion compensator, and outputting pixel unit color interpolation data;

a color horizontal interpolator for outputting color horizontal interpolation data using the color pixel unit compensation data delayed in said pixel unit color interpolator;

a color vertical interpolator for outputting color vertical interpolation data using the color pixel unit compensation data and delayed color pixel unit compensation data from said pixel unit color interpolator;

a color horizontal and vertical interpolator for outputting color horizontal and vertical interpolation data using said data output from the color vertical interpolator;

a multiplexer for selecting one of pixel unit color interpolation data output from said pixel unit color interpolator, color horizontal interpolation data output from said color horizontal interpolator, color vertical interpolation data output from said color vertical interpolator, and color horizontal and vertical interpolation data output from said color horizontal and vertical interpolator, and outputting color half-pixel unit motion compensation data;

a color half-pixel information converter for obtaining color half-pixel information from luminance half-pixel information output from said color motion vector converter; and a color half-pixel processing direction and delay controller for outputting a selection signal to said multiplexer to control the output selection and output delay of said multiplexer.

9. A half-pixel motion compensation controller accepting MPEG2 as claimed in claim 8, wherein said pixel unit color interpolator comprises:

a 9 delay portion for delaying color pixel unit compensation data output from said color pixel unit motion compensator by nine pixels, and outputting the delayed data to said color vertical interpolator;

a 3 delay portion for delaying the data output from said 9 delay portion by three pixels, and outputting the delayed data to said color horizontal interpolator;

a 1 delay portion for delaying the data output from said 3 delay portion by one pixel, and outputting the delayed data to said color horizontal interpolator; and a 4 delay portion for delaying the data output from said 1 delay portion by four pixels to output pixel unit color interpolation data to said multiplexer.

10. A half-pixel motion compensation controller accepting MPEG2 as claimed in claim 8, wherein said color horizontal interpolator comprises:

an adding portion for arithmetically averaging the color pixel unit compensation data delayed from said pixel unit color interpolator; and a 1 delay portion for delaying the data output from said adding portion by one pixel to output color horizontal interpolation data.

11. A half-pixel motion compensation controller accepting MPEG2 as claimed in claim 10, wherein said adding portion comprises:

a first adder for dividing the color pixel unit compensation data delayed from said pixel unit color interpolator in units of two bits, and summing the lowest two bits;

a first latch for latching the output of said first adder for synchronization and outputting two-bit data;

a second latch for dividing the color pixel unit compensation data delayed from said pixel unit color interpolator in units of two bits, and latching the second lowest two bits for synchronization;

a second adder for summing the output of said second latch and the carry output from said first latch;

a third latch for latching the output of said second adder for synchronization to output two-bit data;

a fourth latch for dividing the color pixel unit compensation data delayed from said pixel unit color interpolator in units of two bits, and latching the third lowest two bits for synchronization;

a third adder for summing the output of said fourth latch and the carry output from said third latch;

a fifth latch for latching the output of said third adder for synchronization to output two-bit data;

a sixth latch for dividing the color pixel unit compensation data delayed from said pixel unit color interpolator in units of two bits, and latching the highest two bits for synchronization;

a fourth adder for summing the output of said sixth latch and the carry output from said fifth latch to output two-bit data; and a seventh latch for latching the output of said first, third, and fifth latches for synchronization.

12. A half-pixel motion compensation controller accepting MPEG2 as claimed in claim 8, wherein said color vertical interpolator comprises:

an adding portion for arithmetically averaging the color pixel unit compensation data and delayed color pixel unit compensation data from said pixel unit color interpolator;

a first 1 delay portion for delaying the data output from said adding portion by one pixel to output it to said color horizontal and vertical interpolator;

a second 1 delay portion for delaying the data output from said first 1 delay portion by one pixel to output it to said color horizontal and vertical interpolator; and a 3 delay portion for delaying the data output from said second 1 delay portion by three pixels to output color vertical interpolation data to said multiplexer.

13. A half-pixel motion compensation controller accepting MPEG2 as claimed in claim 12, wherein said adding portion comprises:

a first adder for dividing the color pixel unit compensation data and delayed color pixel unit compensation data from said pixel unit color interpolator in units of two bits, and summing the lowest two bits;

a first latch for latching the output of said first adder for synchronization and outputting two-bit data;

a second latch for dividing the color pixel unit compensation data and delayed color pixel unit compensation data from said pixel unit color interpolator in units of two bits, and latching the second lowest two bits for synchronization;

a second adder for summing the output of said second latch and the carry output from said first latch;

a third latch for latching the output of said second adder for synchronization to output two-bit data;

a fourth latch for dividing the color pixel unit compensation data and delayed color pixel unit compensation data from said pixel unit color interpolator in units of two bits, and latching the third lowest two bits for synchronization;

a third adder for summing the output of said fourth latch and the carry output from said third latch;

a fifth latch for latching the output of said third adder for synchronization to output two-bit data;

a sixth latch for dividing the color pixel unit compensation data and delayed color pixel unit compensation data from said pixel unit color interpolator in units of two bits, and latching the highest two bits for synchronization;

a fourth adder for summing the output of said sixth latch and the carry output from said fifth latch to output two-bit data; and a seventh latch for latching the output of said first, third and fifth latches for synchronization.

14. A half-pixel motion compensation controller accepting MPEG2 as claimed in claim 13, wherein said color horizontal and vertical interpolator comprises an adder for arithmetically averaging the data output from said color vertical interpolator, and outputting color horizontal and vertical interpolation data.

15. A half-pixel motion compensation controller accepting MPEG2 as claimed in claim 14, wherein said adder comprises:

a first adder for dividing the data delayed from said color vertical interpolator in units of two bits, and summing the lowest two bits;

a first latch for latching the output of said first adder for synchronization and outputting two-bit data;

a second latch for dividing the data delayed from said color vertical interpolator in units of two bits, and latching the second lowest two bits for synchronization;

a second adder for summing the output of said second latch and the carry output from said first latch;

a third latch for latching the output of said second adder for synchronization to output two-bit data;

a fourth latch for dividing the color pixel unit compensation data delayed from said color vertical interpolator in units of two bits, and latching the third lowest two bits for synchronization;

a third adder for summing the output of said fourth latch and the carry output from said third latch;

a fifth latch for latching the output of said third adder for synchronization to output two-bit data;

a sixth latch for dividing the data output from said color vertical interpolator in units of two bits, and latching the highest two bits for synchronization;

a fourth adder for summing the output of said sixth latch and the carry output from said fifth latch to output two-bit data; and a seventh latch for latching the output of said first, third and fifth latches for synchronization.

16. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal;

a color half-pixel unit motion compensator for compensating for half-pixel unit motion of said unit-compensated color signal according to color half-pixel information from the color motion vector to produce a half-unit-compensated color signal;

a luminance FIFO for buffering the half-unit-compensated luminance signal produced by said luminance half-pixel unit motion compensator;

a color FIFO for buffering the half-unit-compensated color signal produced by said color half-pixel unit motion compensator;

a luminance FIFO controller for controlling input and output of said luminance FIFO according to sync signals and a frame/field picture and motion coding type selection signal output from the MPEG2 system; and a color FIFO controller for controlling input and output of said color FIFO according to sync signals and a frame/field picture and motion coding type selection signal output from the MPEG2 system, wherein said color motion vector converter comprises an adding portion in which the highest bit of the luminance motion vector is input as carry, 1 is added to the input if the input is negative, the lowest bit of an output of the adding portion is truncated to obtain a color motion vector, and the lowest bit of the color motion vector is half-pixel motion information.

17. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal;

a color half-Pixel unit motion compensator for compensating for half-pixel unit motion of said unit-compensated color signal according to color half-pixel information from the color motion vector to produce a half-unit-compensated color signal;

a luminance FIFO for buffering the half-unit-compensated luminance signal produced by said luminance half-pixel unit motion compensator;

a color FIFO for buffering the half-unit-compensated color signal produced by said color half-pixel unit motion compensator;

a luminance FIFO controller for controlling input and output of said luminance FIFO according to sync signals and a frame/field picture and motion coding type selection signal output from the MPEG2 system; and a color FIFO controller for controlling input and output of said color FIFO according to sync signals and a frame/field picture and motion coding type selection signal output from the MPEG2 system, wherein said luminance FIFO controller comprises:

a luminance write signal generator for generating a write signal according to the respective sync signals and frame/field picture and motion coding type selection signal output from the MPEG2 system, and outputting the write signal to said luminance FIFO; and a luminance read signal generator for generating a read signal according to the respective sync signals and frame/field picture and motion coding type selection signal output from the MPEG2 system, and outputting the read signal to said luminance FIFO.

18. A half-pixel motion compensation controller accepting MPEG2 as claimed in claim 17, wherein said luminance write signal generator comprises:

a selector for selecting one of a macroblock and macroblock sync signal;

a controller for outputting a selection signal to said selector according to picture structure type signals and picture motion type signal output from the MPEG2 system;

a delay for delaying the output of said selector;

a counter for counting the output of said delay and generating a sawtooth-wave signal for not writing unnecessary data;

a write start signal generator for generating a write start signal from the output of said delay;

a write completion signal generator for generating a write completion signal from the output of said counter; and an OR gate for OR-operating the outputs of said controller, counter, write signal start generator, and write completion signal generator, and generating a luminance write signal.

19. A half-pixel motion compensation controller accepting MPEG2 as claimed in claim 17, wherein said luminance read signal generator comprises:

a reset signal generator for generating a reset signal in units of macroblocks according to a slice window signal output from the MPEG2 system, and outputting the result to said luminance FIFO; and a read signal generator for generating a read signal according to said slice window signal output from the MPEG2 system, and outputting the result to said luminance FIFO.

20. A half-pixel motion compensation controller accepting MPEG2 as claimed in claim 17, wherein said color FIFO controller comprises:

a color write signal generator for generating a color write signal according to the respective sync signals and frame/field picture and motion coding type selection signal output from the MPEG2 system, and outputting the result to said color FIFO; and a color read signal generator for generating a color read signal according to the respective sync signals and frame/field picture and motion coding type selection signal output from the MPEG2 system, and outputting the result to said color FIFO.

21. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal; and a color half-pixel unit motion compensator for compensating for half-pixel unit motion of said unit-compensated color signal according to color half-pixel information from the color motion vector to produce a half-unit-compensated color signal, wherein said luminance half-pixel unit motion compensator comprises:

a luminance half-pixel processing direction and delay controller for producing a luminance half-pixel processing direction control signal for controlling a luminance half-pixel processing direction and output delay control signals for controlling a delay between receipt of a unit-compensated luminance signal and a half-unit-compensated luminance signal, and four phase luminance half-pixel unit motion compensators for producing luminance half-pixel motion compensation data from respective phases of a unit-compensated luminance signal according to the luminance half-pixel processing direction control signal and output delay control signals from said luminance half-pixel processing direction and delay controller.

22. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal; and a color half-pixel unit motion compensator for compensating for half-pixel unit motion of said unit-compensated color signal according to color half-pixel information from the color motion vector to produce a half-unit-compensated color signal, wherein said color half-pixel unit motion compensator comprises:

a pixel unit color interpolator for delaying color pixel unit compensation data output from said color pixel unit motion compensator, and outputting pixel unit color interpolation data, a color horizontal interpolator for outputting color horizontal interpolation data using the color pixel unit compensation data delayed in said pixel unit color interpolator, a color vertical interpolator for outputting color vertical interpolation data using the color pixel unit compensation data and delayed color pixel unit compensation data from said pixel unit color interpolator, a color horizontal and vertical interpolator for outputting color horizontal and vertical interpolation data using said data output from the color vertical interpolator;

a multiplexer for selecting one of pixel unit color interpolation data output from said pixel unit color interpolator, color horizontal interpolation data output from said color horizontal interpolator, color vertical interpolation data output from said color vertical interpolator, and color horizontal and vertical interpolation data output from said color horizontal and vertical interpolator, and outputting color half-pixel unit motion compensation data;

a color half-pixel information converter for obtaining color half-pixel information from luminance half-pixel information output from said color motion vector converter; and a color half-pixel processing direction and delay controller for outputting a selection signal to said multiplexer to control the output selection and output delay of said multiplexer.

23. A half-pixel motion compensation controller accepting MPEG2 data from a MPEG2 system, comprising:

a luminance pixel unit motion compensator for compensating for pixel unit motion of a luminance signal according to an input luminance motion vector to produce a unit-compensated luminance signal;

a luminance half-pixel unit motion compensator for compensating for half-pixel unit motion of said unit-compensated luminance signal according to luminance half-pixel information included in said luminance motion vector to produce a half-unit-compensated luminance signal;

a color motion vector converter for obtaining a motion vector for a color signal from said luminance motion vector;

a color pixel unit motion compensator for compensating for pixel unit motion of the color signal according to the color motion vector obtained by said color motion vector converter to produce a unit-compensated color-signal; and a color half-pixel unit motion compensator for compensating for half-pixel unit motion of said unit-compensated color signal according to color half-pixel information from the color motion vector to produce a half-unit-compensated color signal, wherein said color motion vector converter comprises an adding portion in which the highest bit of the luminance motion vector is input as carry, 1 is added to the input if the input is negative, the lowest bit of an output of the adding portion is truncated to obtain a color motion vector, and the lowest bit of the color motion vector is half-pixel motion information.

* * * * *